(12) United States Patent
Kupratis et al.

(10) Patent No.: US 11,840,958 B2
(45) Date of Patent: Dec. 12, 2023

(54) TURBOFAN WITH OFFSET GAS GENERATOR AND AUXILIARY POWER CORE

(71) Applicant: RTX Corporation, Farmington, CT (US)

(72) Inventors: Daniel Bernard Kupratis, Wallingford, CT (US); Paul R. Hanrahan, Sedona, AZ (US); Christopher J. Hanlon, Sturbridge, MA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/393,508

(22) Filed: Aug. 4, 2021

(65) Prior Publication Data

US 2023/0037652 A1 Feb. 9, 2023

(51) Int. Cl.
*F02C 6/02* (2006.01)
*F02C 3/10* (2006.01)
*F02C 7/36* (2006.01)
*F02C 3/14* (2006.01)
*F02C 7/04* (2006.01)
*F02K 3/04* (2006.01)

(52) U.S. Cl.
CPC .............. *F02C 3/10* (2013.01); *F02C 6/02* (2013.01); *F02C 7/36* (2013.01); *F02C 3/14* (2013.01); *F02C 7/04* (2013.01); *F02K 3/04* (2013.01)

(58) Field of Classification Search
CPC ...... F02C 6/02; F02C 3/10; F02C 9/18; F02C 3/13; F02C 6/08; F02C 7/04; F02K 3/12
See application file for complete search history.

(56) References Cited

U.S. PATENT DOCUMENTS

| 3,149,461 | A * | 9/1964 | Eichholtz ................. F02K 3/12 60/761 |
| 9,828,911 | B2 | 11/2017 | Burghardt |
| 10,094,281 | B2 | 10/2018 | Chandler et al. |
| 10,415,466 | B2 | 9/2019 | Suciu et al. |
| 10,641,124 | B2 | 5/2020 | Chandler |
| 10,814,989 | B2 | 10/2020 | Vessot et al. |
| 2002/0190159 | A1* | 12/2002 | Franchet ................. F02K 3/075 244/74 |
| 2006/0185346 | A1* | 8/2006 | Rolt ......................... F02K 3/06 60/226.1 |
| 2012/0272656 | A1* | 11/2012 | Norris ....................... F02C 9/18 60/792 |

(Continued)

*Primary Examiner* — Thomas P Burke

(74) *Attorney, Agent, or Firm* — CANTOR COLBURN LLP

(57) ABSTRACT

A gas turbine engine includes a fan positioned at an engine central longitudinal axis, and a fan drive turbine located at the engine central longitudinal axis and configured to drive rotation of the fan. A gas generator is non-coaxial with the fan drive turbine and operably connected to the fan drive turbine such that exhaust from the gas generator drives rotation of the fan drive turbine. An auxiliary power core is located at the engine central longitudinal axis, and one or more bleed passages connect the gas generator and the auxiliary power core. The one or more bleed passages are configured to selectably combine a bleed airflow from the gas generator and an auxiliary core airflow at the auxiliary power core to direct the combined airflow to the fan drive turbine to increase output of the fan drive turbine.

17 Claims, 2 Drawing Sheets

(56) References Cited

U.S. PATENT DOCUMENTS

| | | | |
|---|---|---|---|
| 2015/0247456 A1* | 9/2015 | Suciu | F02C 3/14 |
| | | | 60/791 |
| 2017/0058783 A1* | 3/2017 | Tan | F02C 9/18 |
| 2021/0164392 A1* | 6/2021 | Harvey | F02C 7/32 |
| 2021/0172333 A1 | 6/2021 | Suciu et al. | |

* cited by examiner

TURBOFAN WITH OFFSET GAS
GENERATOR AND AUXILIARY POWER
CORE

BACKGROUND

Exemplary embodiments of the present disclosure pertain to the art of gas turbine engines, and in particular to high bypass ratio turbofan engines.

Typical gas turbine engine compressors are sized for maximum rated thrust, which makes them larger than is necessary for part-power cruise. This results in relatively high specific fuel consumption (SFC) which reduces available range. Also, in some applications, it is desired to reduce the ingestion of particulate matter such as sand, dust or the like into the core section of the gas turbine engine since this can cause erosion of components in the high pressure compressor, combustor and turbine sections of the gas turbine engine.

BRIEF DESCRIPTION

In one embodiment, a gas turbine engine includes a fan positioned at an engine central longitudinal axis, and a fan drive turbine located at the engine central longitudinal axis and configured to drive rotation of the fan. A gas generator is non-coaxial with the fan drive turbine and operably connected to the fan drive turbine such that exhaust from the gas generator drives rotation of the fan drive turbine. An auxiliary power core is located at the engine central longitudinal axis, and one or more bleed passages connect the gas generator and the auxiliary power core. The one or more bleed passages are configured to selectably combine a bleed airflow from the gas generator and an auxiliary core airflow at the auxiliary power core to direct the combined airflow to the fan drive turbine to increase output of the fan drive turbine.

Additionally or alternatively, in this or other embodiments a vent passage is located at the auxiliary power core to selectably direct a portion of the bleed airflow out of the auxiliary power core.

Additionally or alternatively, in this or other embodiments the bleed flow is configured to preferably direct entrained sand through the one or more bleed passages and not to continue through gas generator.

Additionally or alternatively, in this or other embodiments an auxiliary combustor is located at the auxiliary power core to selectably combust the combined airflow.

Additionally or alternatively, in this or other embodiments the bleed airflow enters the auxiliary power core at an annular mixing chamber upstream of the auxiliary combustor.

Additionally or alternatively, in this or other embodiments a plurality of output passages direct airflow output from the auxiliary combustor to the fan drive turbine.

Additionally or alternatively, in this or other embodiments the exhaust from the gas generator and the airflow output from the auxiliary combustor are combined at a turbine inlet manifold.

Additionally or alternatively, in this or other embodiments the gas generator is a two spool gas generator including a compressor section, a combustor, and a turbine section all arrayed along a gas generator central axis.

Additionally or alternatively, in this or other embodiments the one or more bleed passages extend from the gas generator between a low pressure compressor and a high pressure compressor of the compressor section.

Additionally or alternatively, in this or other embodiments an impeller is located at the auxiliary power core driven by the fan drive turbine.

Additionally or alternatively, in this or other embodiments the fan drive turbine is operably connected to the fan through a speed change mechanism.

Additionally or alternatively, in this or other embodiments an inlet of the gas generator is located between two circumferentially adjacent fan exit guide vanes located downstream of the fan.

In another embodiment, a method of operating a gas turbine engine includes driving a fan located at an engine central longitudinal axis via operation of a fan drive turbine located at the engine central longitudinal axis, driving the fan drive turbine via operation of a gas generator disposed non-coaxial with the fan drive turbine such that exhaust from the gas generator drives rotation of the fan drive turbine, selectably directing a bleed airflow from the gas generator to an auxiliary power core disposed at the engine central longitudinal axis, and combining the bleed airflow from the gas generator and an auxiliary core airflow at the auxiliary power core to direct the combined airflow to the fan drive turbine to increase output of the fan drive turbine.

Additionally or alternatively, in this or other embodiments a portion of the bleed airflow is selectably directed out of the auxiliary power core via a vent passage.

Additionally or alternatively, in this or other embodiments the combined airflow is selectably at an auxiliary combustor of the auxiliary power core.

Additionally or alternatively, in this or other embodiments airflow output from the auxiliary combustor is directed to the fan drive turbine via a plurality of output passages.

Additionally or alternatively, in this or other embodiments the exhaust from the gas generator and the airflow output from the auxiliary combustor are combined at a turbine inlet manifold.

Additionally or alternatively, in this or other embodiments the gas generator is a two spool gas generator including a compressor section, a combustor, and a turbine section all arrayed along a gas generator central axis.

Additionally or alternatively, in this or other embodiments the one or more bleed passages extend from the gas generator between a low pressure compressor and a high pressure compressor of the compressor section.

Additionally or alternatively, in this or other embodiments the bleed flow is directed from the gas generator to the auxiliary power core to direct entrained sand through bleed passage and not to continue through gas generator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
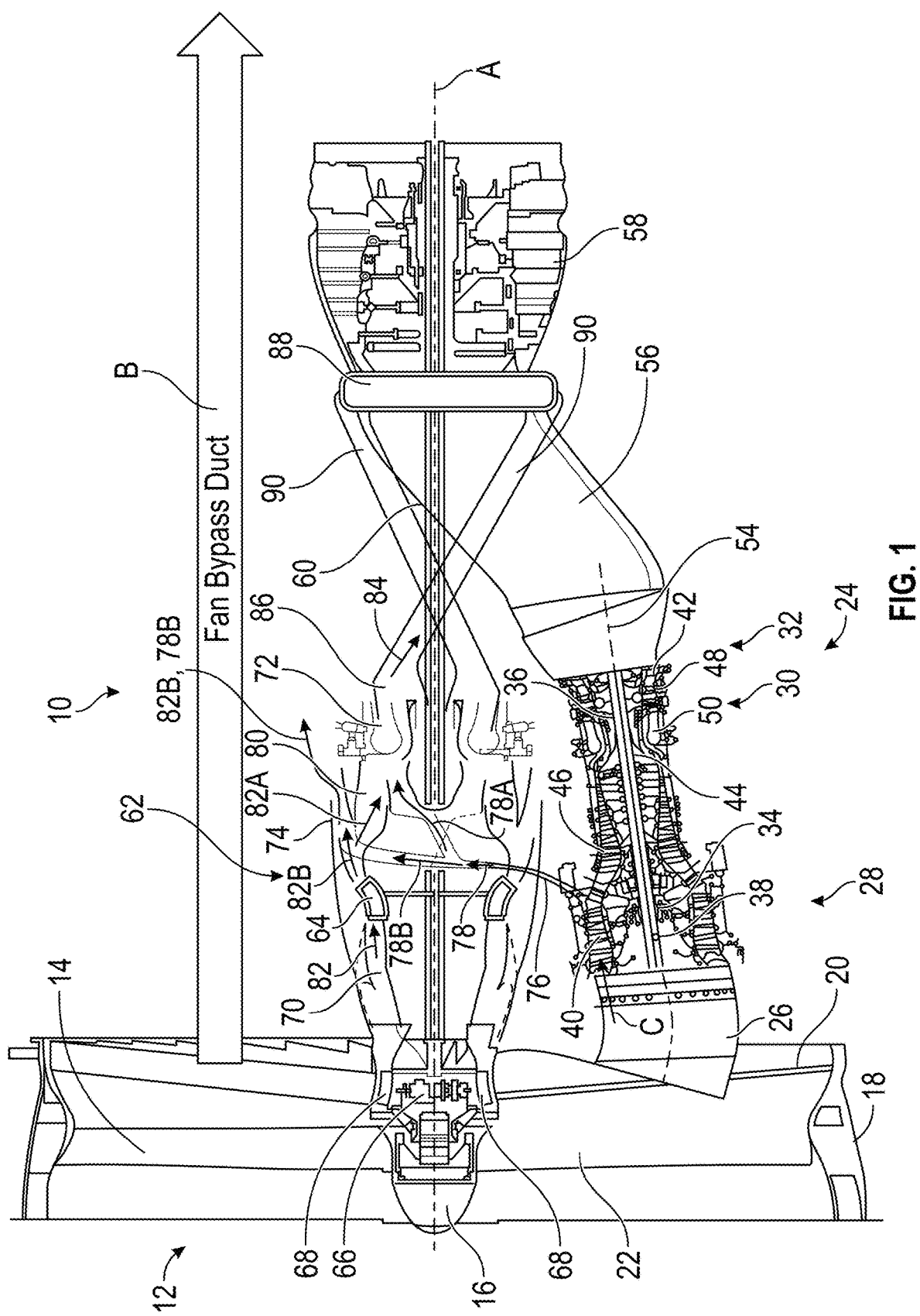
FIG. 1 is a partial cross-sectional view of an embodiment of a gas turbine engine.

FIG. 1 schematically illustrates a gas turbine engine 10. The gas turbine engine 10 as disclosed herein generally incorporates a fan section 12 located at an engine central longitudinal axis A. The fan section 12 includes fan 22 having a plurality of fan blades 14 extending radially outwardly from a fan hub 16, and may be disposed in a fan case 18. The fan section 12 drives air along a bypass flow path B in a bypass duct. In some embodiments, the fan section 12 includes a plurality of fan exit guide vanes 20 to turn the airflow exiting the fan 22 along the bypass duct.

The gas turbine engine 10 includes a two spool gas generator 24, which is radially offset from the engine central longitudinal axis A. The gas generator 24 has an inlet duct 26 located between circumferentially adjacent fan exit guide vanes 20 which guides a core airflow into the gas generator 24. The gas generator 24 is a two spool configuration having a compressor section 28, a combustor section 30 and a turbine section 32. The compressor section 28 drives air along the core flow path C for compression and communication into the combustor section 30 then expansion through the turbine section 32. Although depicted as a two-spool configuration in the disclosed non-limiting embodiment, it should be understood that the concepts described herein are not limited to use with two-spool configurations as the teachings may be applied to other types of turbine engines including three-spool architectures.

The exemplary gas generator 24 generally includes a low speed spool 34 and a high speed spool 36. The low speed spool 34 generally includes an inner shaft 38 that interconnects a low pressure compressor 40 and a low pressure turbine 42. The high speed spool 36 includes an outer shaft 44 that interconnects a high pressure compressor 46 and high pressure turbine 48. A combustor 50 is arranged in the gas generator 24 between the high pressure compressor 46 and the high pressure turbine 48. The inner shaft 38 and the outer shaft 44 are concentric and rotate via bearing systems about a gas generator axis 54 which is collinear with their longitudinal axes. The core airflow is compressed by the low pressure compressor 40 then the high pressure compressor 46, mixed and burned with fuel in the combustor 50, then expanded over the high pressure turbine 48 and low pressure turbine 42. The turbines 42, 48 rotationally drive the respective low speed spool 34 and high speed spool 36 in response to the expansion.

The low pressure turbine 42 of the gas generator 24 is connected to a transition duct 56 such that exhaust from the gas generator 24 flows through the transition duct 56 to an inlet of a fan drive turbine 58 located on the engine central longitudinal axis A. The gas generator exhaust then drives rotation of the fan drive turbine 58. The fan drive turbine 58 is connected to the fan 22 via a fan drive turbine shaft 60 which extends along the engine central longitudinal axis A. An auxiliary power core 62 is located between the fan 22 and the fan drive turbine 58 and includes an impeller 64 driven by the fan drive turbine shaft 60. In some embodiments, the fan drive turbine shaft 60 is connected to the fan 22 through a speed change mechanism, which in exemplary gas turbine engine 20 is illustrated as a geared architecture 66 to drive the fan 22 at a different speed than the impeller 64 and the fan drive turbine 58. The geared architecture 66 may be an epicycle gear train, such as a planetary gear system or other gear system, with a gear reduction ratio of greater than about 2.3:1. It should be understood, however, that the above parameters are only exemplary of one embodiment of a geared architecture 66.

Figure 2:
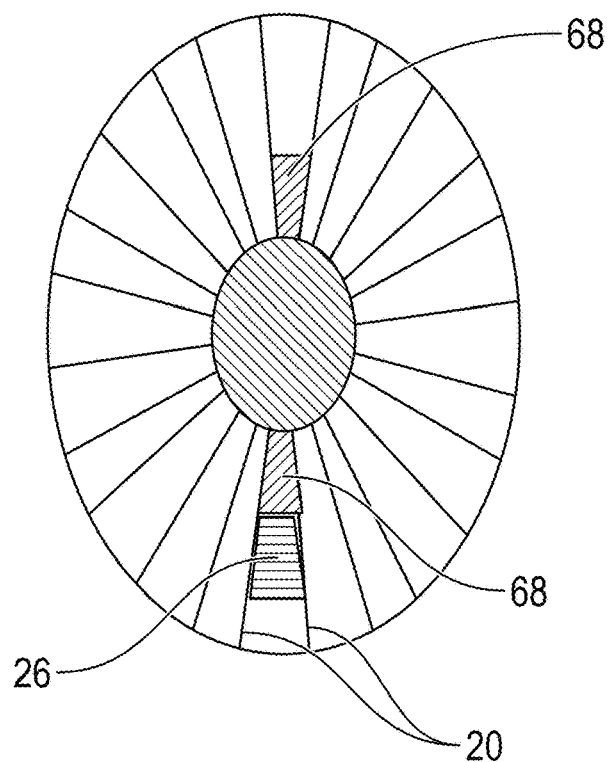
FIG. 2 is a schematic illustration of an embodiment of an inlet arrangement for a gas turbine engine.
Figure 3:
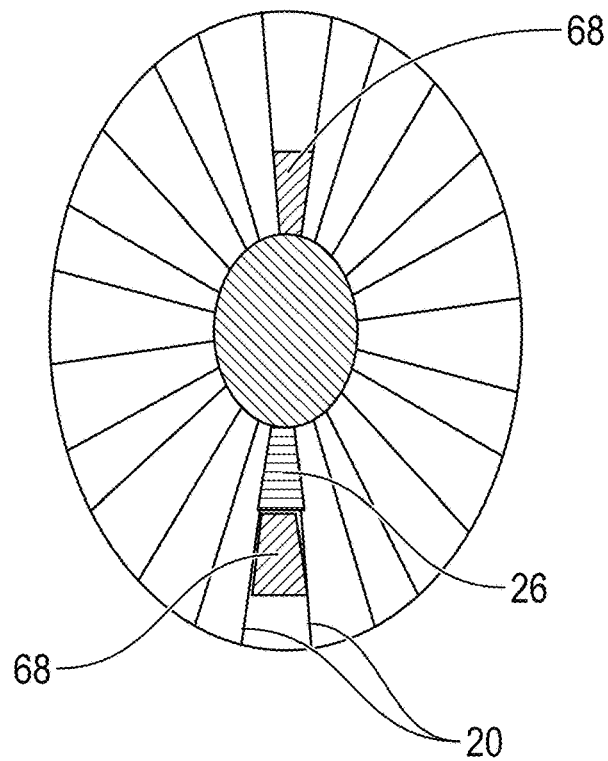
FIG. 3 is a schematic illustration of another embodiment of an inlet arrangement for a gas turbine engine.

The auxiliary power core 62 includes two auxiliary core inlets 68 to admit airflow into the auxiliary power core 62. The auxiliary core inlets 68 are each located between two circumferentially adjacent fan exit guide vanes 20. Referring now to FIG. 2, in some embodiments the auxiliary core inlets 68 are located 180 degrees apart relative to the engine central longitudinal axis A. Further, as shown in FIG. 2, in some embodiments the inlet duct 26 is located radially outboard of one of the auxiliary core inlets 68, while in other embodiments such as shown in FIG. 3 the inlet duct 26 is located radially inboard of one of the auxiliary core inlets 68.

Referring again to FIG. 1, the auxiliary power core 62 includes an annular inlet passage 70 extending from the auxiliary core inlets 68 to the impeller 64. The impeller 64 compresses the airflow 82, which is directed to an auxiliary combustor 72, where fuel is injected and mixed with the airflow and combusted. In some embodiments, the auxiliary combustor 72 is a can-annular combustor. A vent passage 74 is located upstream of the auxiliary combustor 72. The impeller 64 is configured to direct erosion causing particulates in the airflow 82B, such as sand and dust, radially outwardly and into the vent passage 74 so that such particulates enter the bypass flowpath B, thus preventing erosion of components of the fan drive turbine 58.

A bleed passage 76 extends from an exit of the low pressure compressor 40 to the auxiliary power core 62 between the impeller 64 and the auxiliary combustor 72. Bleed airflow 78A is selectably directed through the bleed passage 76 from the low pressure compressor 40 to an annular mixing chamber 80 at which the bleed airflow 78A mixes with the auxiliary airflow 82A upstream of the auxiliary combustor 72.

In some embodiments, the exhaust airflow 84 from the auxiliary combustor 72 is directed into an annular combustor exhaust manifold 86 and then to an annular turbine inlet manifold 88 upstream of the fan drive turbine 58. A plurality of output passages 90 connect the combustor exhaust manifold 86 and the turbine inlet manifold 88 to convey the exhaust airflow 84 to the fan drive turbine 58.

Some embodiments, such as shown in FIG. 1, include four output passages 90 equally circumferentially spaced about the engine central longitudinal axis A. One skilled in the art will readily appreciate that other quantities of output passages 90 may be utilized, and that the circumferential spacing of the output passages 90 may be varied. Further, as illustrated in FIG. 1, the output passages 90 may be skewed circumferentially between the combustor exhaust manifold 86 and the turbine inlet manifold 88.

The gas turbine engine 10 is configured to operate in several operational modes. In a first mode the auxiliary power core 62 is operating and the bleed passage 76 is opened to direct the bleed airflow 78A to the auxiliary power core 62. The bleed airflow 78A and the airflow directed through the auxiliary power core 62 are combusted at the auxiliary combustor 72. This mode is utilized for increased thrust over other operational modes, and may be utilized at, for example, takeoff. In a second mode, the bleed passage 76 is opened to direct bleed airflow 78 into the auxiliary power core 62, but the auxiliary combustor 72 is not operated. This second mode has reduced thrust compared to the first mode, but opening the bleed passage 76 decontaminates the high speed spool 36 of the gas generator 24 by directing the bleed airflow 78B, containing sand, dust or other contaminants away from the high speed spool 36 and to the auxiliary power core 62. This bleed airflow 78B is then removed from the auxiliary power core 62 via the vent passage 74. Further, in this second mode of operation the auxiliary power core 62 protects the gas generator 24 from starting vortex and ground vortex conditions. The second mode may be suitable for use for derated takeoff operation, where it is desired to achieve sand separation but do not need full power, compared to the first mode, and reduces fuel consumption versus the first mode. In a third mode, the bleed passage 76 is closed, so no bleed airflow 78 is directed to the auxiliary power core 62. Such a mode may be utilized at, for example, climb and cruise following aircraft takeoff.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine, comprising:
    a fan disposed at an engine central longitudinal axis;
    a fan drive turbine disposed at the engine central longitudinal axis and configured to drive rotation of the fan;
    a gas generator non-coaxial with the fan drive turbine and operably connected to the fan drive turbine such that exhaust from the gas generator drives rotation of the fan drive turbine;
    an auxiliary power core disposed at the engine central longitudinal axis; and
    one or more bleed passages to connect the gas generator and the auxiliary power core;
    wherein the one or more bleed passages are configured to combine a bleed airflow from the gas generator and an auxiliary core airflow at the auxiliary power core to direct the combined airflow to the fan drive turbine to increase output of the fan drive turbine; and
    an auxiliary combustor at the auxiliary power core to combust the combined airflow, the auxiliary combustor disposed axially upstream of the fan drive turbine;
    wherein an inlet of the gas generator is located in an opening defined between two directly circumferentially adjacent fan exit guide vanes located downstream of the fan.

2. The gas turbine engine of claim 1, further comprising a vent passage at the auxiliary power core to direct a portion of the bleed airflow out of the auxiliary power core.

3. The gas turbine engine of claim 2, wherein the bleed airflow is configured to direct entrained sand through the one or more bleed passages and not to continue through the gas generator.

4. The gas turbine engine of claim 1, wherein the bleed airflow enters the auxiliary power core at an annular mixing chamber upstream of the auxiliary combustor.

5. The gas turbine engine of claim 1, further comprising a plurality of output passages to direct airflow output from the auxiliary combustor to the fan drive turbine.

6. The gas turbine engine of claim 5, wherein the exhaust from the gas generator and the airflow output from the auxiliary combustor are combined at a turbine inlet manifold.

7. The gas turbine engine of claim 1, wherein the gas generator is a two spool gas generator including:
    a compressor section;
    a combustor; and
    a turbine section all arrayed along a gas generator central axis.

8. The gas turbine engine of claim 7, wherein the one or more bleed passages extend from the gas generator between a low pressure compressor and a high pressure compressor of the compressor section.

9. The gas turbine engine of claim 7, further comprising an impeller at the auxiliary power core driven by the fan drive turbine.

10. The gas turbine engine of claim 1, wherein the fan drive turbine is operably connected to the fan through a speed change mechanism.

11. A method of operating a gas turbine engine, comprising:
    driving a fan disposed at an engine central longitudinal axis via operation of a fan drive turbine disposed at the engine central longitudinal axis;
    driving the fan drive turbine via operation of a gas generator disposed non-coaxial with the fan drive turbine such that exhaust from the gas generator drives rotation of the fan drive turbine;
    directing a bleed airflow from the gas generator to an auxiliary power core disposed at the engine central longitudinal axis; and
    combining the bleed airflow from the gas generator and an auxiliary core airflow at the auxiliary power core to direct the combined airflow to the fan drive turbine to increase output of the fan drive turbine; and
    combusting the combined airflow at an auxiliary combustor of the auxiliary power core, the auxiliary combustor disposed axially upstream of the fan drive turbine;
    wherein an inlet of the gas generator is located in an opening defined between two directly circumferentially adjacent fan exit guide vanes located downstream of the fan.

12. The method of claim 11, further comprising directing a portion of the bleed airflow out of the auxiliary power core via a vent passage.

13. The method of claim 11, further comprising directing airflow output from the auxiliary combustor to the fan drive turbine via a plurality of output passages.

14. The method of claim 13, further comprising combining the exhaust from the gas generator and the airflow output from the auxiliary combustor at a turbine inlet manifold.

15. The method of claim 11, wherein the gas generator is a two spool gas generator including:
    a compressor section;
    a combustor; and a turbine section all arrayed along a gas generator central axis.

16. The method of claim 15, wherein the one or more bleed passages extend from the gas generator between a low pressure compressor and a high pressure compressor of the compressor section.

17. The method of claim 11, wherein the bleed airflow is directed from the gas generator to the auxiliary power core to direct entrained sand through the one or more bleed passages and not to continue through the gas generator.

* * * * *